United States Patent Office 3,496,423
Patented Feb. 17, 1970

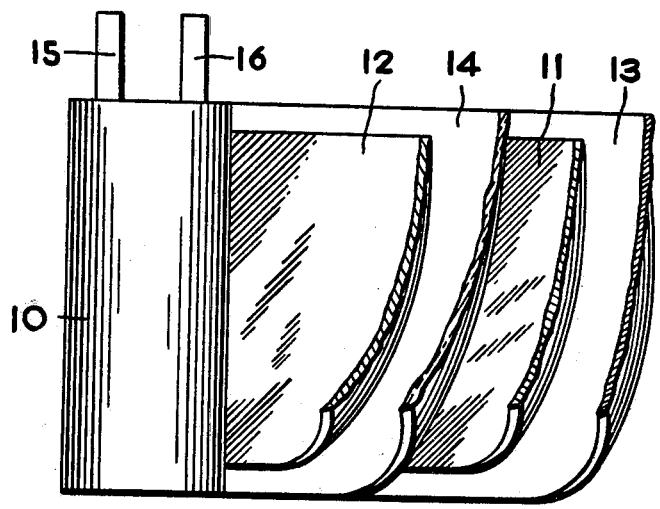

---

3,496,423
CAPACITOR CONTAINING EPOXIDIZED DIELECTRIC SPACER PAPER OR FILM
Sidney D. Ross, Williamstown, Mass., assignor to Sprague Electric Company, North Adams, Mass., a corporation of Massachusetts
Filed Jan. 22, 1968, Ser. No. 699,718
Int. Cl. H01g 9/00, 1/00
U.S. Cl. 317—230                                       6 Claims

ABSTRACT OF THE DISCLOSURE

A capacitor has at least two electrodes separated by spacer paper or film having chemically bonded epoxide-containing radicals as an integral part of said paper or film.

BACKGROUND OF THE INVENTION

The present invention relates to an epoxy group-containing dielectric spacer paper or film and a capacitor employing said paper or film.

Chlorinated hydrocarbons, particularly chlorinated aromatic hydrocarbons, find use as the dielectric material in capacitors, transformers, and the like. These compositions, as available in commerce, are mixtures of compounds which are mainly quite stable but which also contain less stable isomers decomposable under electric stress, particularly AC, yielding hydrogen chloride. The presence of hydrogen chloride is inherently harmful to the dielectric system; but its most serious effect is that it initiates a series of chemical and electrochemical reactions which effectively destroy the dielectric material and lead to a short circuit of the device.

To overcome this problem, so-called scavengers or getter materials have been incorporated into dielectrics for the purposes of removing or neutralizing the effect of the hydrogen chloride. One patent teaches that effective hydrogen chloride scavengers are epoxide compounds, for example, the glycidyl ethers and derivatives of ethylene oxide.

At present the epoxide scavengers are added to the dielectric oil. This creates problems in maintaining the resistivity of the oil and insuring that a sufficient concentration of the epoxide is present in the finished capacitor. Since the epoxides are reactive compounds, their inclusion in the oil necessitates milder and perhaps less effective processing conditions for maintaining the purity and resistivity of the dielectric oil. It is believed that the epoxide compound, being in the oil, may not be in the most effective site for its stabilizing and scavenging function. This would certainly be true if the initial degradative attack in a capacitor is in the paper or film. It is believed that the art would be significantly advanced if the scavenging action of the epoxide could be initiated in the immediate region of the spacer paper or film.

Although the present invention is directed primarily at electrostatic capacitors, it is to be noted that the presence of chlorides in electrolytic capacitors also results in corrosion and the eventual destruction of the device. Here the effects of deleterious anions (e.g. chloride, bromide and sulfate) are manifested even more rapidly, since the currents in electrolytic capacitors are significantly higher than in electrostatic capacitors. In electrolytic capacitors, too, epoxide scavengers may be shown to exert a beneficial effect by immobilizing undesirable anions.

It is an object of the present invention to provide a capacitor paper or film having pendant epoxy-containing radicals.

A further object is to provide a capacitor employing an epoxide containing capacitor paper or film.

It is another object of the invention to provide a halogenated hydrocarbon dielectric capacitor employing an epoxide containing capacitor paper or film.

SUMMARY OF THE INVENTION

The present invention is concerned with a dielectric spacer paper or film having chemically bonded as an integral part thereof epoxy-containing radicals. In a more limited sense, the epoxy-containing radicals are equivalent to about 0.1–3.0% and preferably 0.1–1.0% by weight of the paper.

The invention is also concerned with an electrical capacitor comprising at least two electrodes, said electrodes being separated by spacer paper or film having chemically bonded as an integral part thereof epoxide-containing radicals. In a more limited embodiment, the capacitor is an electrolytic capacitor.

In a still more limited version of the invention, an electrical capacitor comprises at least two convolutely wound metal electrodes, the opposing faces thereof being separated by a dielectric spacer paper or film having chemically bonded as an integral part thereof epoxide-containing radicals; said capacitor being impregnated with a liquid halogenated organic dielectric.

BRIEF DESCRIPTION OF THE DRAWING

The drawing shows a capacitor assembly which utilizes the epoxide-modified spacer paper or film of the present invention. The capacitor assembly 10 comprises a pair of electrode foils 11 and 12 separated by epoxide-modified spacer paper or film 13 and 14. Electrode tabs 15 and 16 are in electrical communication with foils 11 and 12 respectively.

DETAILED DESCRIPTION OF THE INVENTION

Example I

A strip of ½ mil thick dried kraft capacitor paper is immersed in dry benzene containing 10% by weight of pyridine. Epichlorohydrin equivalent to 5% by weight of the kraft paper is added and the mixture refluxed for about 8 hours. The modified paper is then rinsed with fresh benzene.

One method for determining the percent epoxide group in the capacitor paper is as follows: a weighed sample of the epoxide-containing kraft paper is added to 100 ml. of a $HCl\text{-}CaCl_2 \cdot H_2O$ solution (810 gms. of $CaCl_2 \cdot H_2O$ in 600 ml. of $H_2O$ containing 95 ml. of concentrated HCl). This mixture is titrated with 1 N sodium hydroxide to the phenolphthalein endpoint.

Calculations:

$A$=ml. of 1 N NaOH for 100 ml. of HCl-CaCl reagent alone $B$=ml. of 1 N NaOH for sample $$\frac{(A-B) \times \text{normality of NaOH} \times \text{M.W. of epoxide} \times 100}{\text{gms. of sample} \times 1000}$$

= percent epoxide group in sample

The epoxide modified capacitor paper of film is most effective as a scavenger when the epoxide group represents from about 0.1–1.0% by weight of the paper or film. It is to be understood, however, that the epoxide group percentage can extend up to 3.0% by weight of the paper without any deleterious effect.

EXAMPLE II

A strip of 1 mil thick dried Benares capacitor paper is immersed in dry benzene containing 10% by weight of pyridine and 5% by weight of the Benares paper of dicyclopentadiene dioxide. This is refluxed for about 8 hours and then rinsed with fresh benzene.

A portion of the epoxide-modified Benares paper is titrated as above, in order to determine if the epoxide group represents from 0.1–1.0% by weight of the paper.

EXAMPLE III

A strip of ½ mil thick dried kraft paper is immersed in dry benzene containing 10% by weight of pyridine and 5% by weight of the paper of allyl bromide. The mixture is refluxed 4 hours and then rinsed with fresh benzene. This treatment converts some of the hydroxyl groups in cellulose to allyl ether groups.

The paper is then placed in a mixture of acetic acid containing 10% peracetic acid and shaken for 48 hours at room temperature to convert the double bonds of some of the allyl groups to epoxide rings. Titration as above will determine if the reaction yields epoxide groups representing 0.1–1.0% by weight of the paper.

The material contemplated to be modified by the technique of the present invention includes cellulose papers, for example kraft, Benares and manila papers. Substituted cellulose such as ethyl cellulose and cellulose acetate is likewise contemplated. In addition, non-fibrous, extruded or cast films such as polyvinyl alcohol can also be modified in accordance with the present invention. Any epoxide compound may be employed herein so long as when reacted with the paper or film it yields modified paper or film having pendant epoxide-containing radicals.

The capacitor depicted in the drawing is a typical example of capacitors within the scope of the present invention. It can comprise a pair of aluminum foils separated by the epoxide-modified capacitor paper or film of the present invention. Electrode tabs are contacted to the foils and the combination is convolutely wound and inserted into a suitable container, e.g. a metal can. The unit is then impregnated with chlorinated diphenyl and sealed with an appropriate end seal. As corrosive hydrogen chloride is formed during use of the capacitor, the epoxide groups are ideally located to neutralize its affect.

By the present invention the epoxide groups of the modified spacer material readily neutralize the corrosive decomposition products of the chlorinated dielectric, e.g. the hydrogen chloride, of an electrostatic capacitor and also neutralizes the deleterious anions, e.g. chloride, bromide, etc. of an electrolytic capacitor.

Among the preferred dielectrics are chlorinated diphenyl containing 42% by weight of bound chlorine, pentachlorodiphenyls blended with trichlorobenzene, chlorine-substituted phenylindane derivatives, etc.

When the modified spacer paper or film of the present invention is employed in an electrolytic capacitor, one electrode can be an anodized aluminum foil separated from a metal cathode by said spacer paper or film. The electrolyte can be any prior art electrolyte, such as a glycol-borate electrolyte.

Since it is obvious that many changes and modifications may be made in the above-described details without departing from the spirit and scope of the invention, it is to be understood that said invention is not to be limited to said details except as set forth in the appended claims.

What is claimed is:
1. An electrical capacitor comprising at least two electrodes and a paper spacer or film dielectric having epoxide-containing radicals chemically bonded thereto as an integral part thereof, said dielectric being disposed between and separating said electrodes.
2. The capacitor of claim 1 wherein the epoxide-containing radicals are equivalent to about 0.1–3.0% by weight of said paper or film.
3. The capacitor of claim 2 wherein the epoxide-containing radicals are equivalent to about 0.1–1.0% by weight of said paper or film.
4. The capacitor of claim 3 wherein one of said two electrodes is an anodized aluminum anode and said capacitor includes an electrolyte in contact with said anodised aluminum anode.
5. The capacitor of claim 3 impregnated with a liquid halogenated dielectric.
6. The capacitor of claim 5 wherein the two electrodes are convolutely wound aluminum electrodes.

References Cited
UNITED STATES PATENTS

| 1,992,545 | 2/1935 | Robinson | 317—230 |
| 1,997,562 | 4/1935 | Rhodes | 317—230 |
| 2,072,797 | 3/1937 | Clark et al. | 317—258 |

FOREIGN PATENTS

| 349,726 | 6/1931 | Great Britain. |

JAMES D. KALLAM, Primary Examiner

U.S. Cl. X.R.

252—62.2; 317—258